United States Patent [19]

Halcomb et al.

[11] Patent Number: 4,734,146
[45] Date of Patent: Mar. 29, 1988

[54] METHOD OF PRODUCING A COMPOSITE SINE WAVE BEAM

[75] Inventors: Ronald G. Halcomb, Tulsa; Theodore K. Vogt, Claremore, both of Okla.

[73] Assignee: Rockwell International Corporation, El Segundo, Calif.

[21] Appl. No.: 845,913

[22] Filed: Mar. 31, 1986

[51] Int. Cl.⁴ .................. B32B 31/00; E04C 3/30
[52] U.S. Cl. .................. 156/148; 52/729; 52/734; 156/174; 156/182; 156/264; 156/393
[58] Field of Search ............ 156/174, 148, 182, 264, 156/393, 210, 152, 426, 245; 52/729, 734; 428/107, 108, 111, 119, 120, 182, 185, 186, 375, 377, 397, 399; 244/119, 173; 264/257, 258

[56] References Cited

U.S. PATENT DOCUMENTS

| | | | |
|---|---|---|---|
| 4,020,202 | 4/1977 | Kreft | 428/377 X |
| 4,084,029 | 4/1978 | Johnson et al. | 156/210 X |
| 4,177,306 | 12/1979 | Schulz et al. | 428/119 X |
| 4,379,798 | 4/1983 | Palmer et al. | 428/114 X |
| 4,385,952 | 5/1983 | Futakuchi et al. | 156/174 |
| 4,512,836 | 4/1985 | Tucci | 156/174 |
| 4,593,870 | 6/1986 | Cronkhite et al. | 244/119 X |
| 4,613,473 | 9/1986 | Layden et al. | 264/258 |

FOREIGN PATENT DOCUMENTS 0041210 3/1980 Japan ......................... 156/210

Primary Examiner—Donald E. Czaja
Assistant Examiner—Geoffrey L. Knable
Attorney, Agent, or Firm—Charles T. Silberberg; Max Geldin

[57] ABSTRACT

A method for producing a composite structural beam, particularly a sine wave beam, is disclosed utilizing as an essential feature, the bonding of the junctures of the sine wave web to the opposite flange areas of the beam with a fibrous braided material. The braiding is carried out during assembly of the composite web and composite flange components, prior to curing the components. In one embodiment the braided material extends along the entire height of the web, as well as along the flange areas, and is bonded thereto. In another embodiment the braided material does not extend along the entire height of the web, but only along the opposite edge portions of the web adjacent the junctures thereof with the flanges, the central portion of the web having no braided material applied thereto.

30 Claims, 19 Drawing Figures

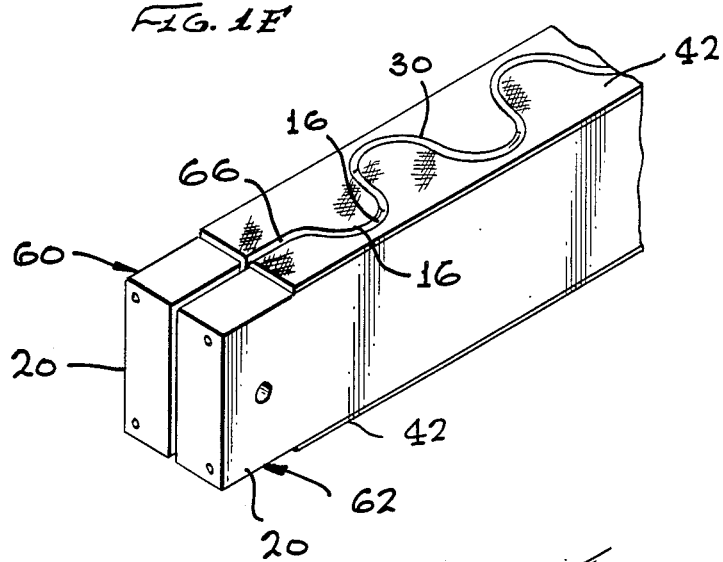
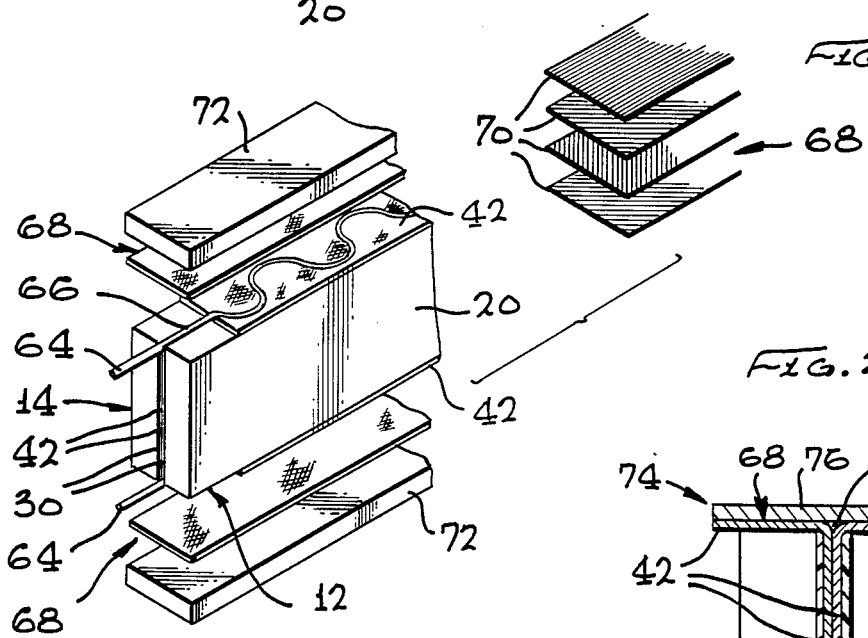
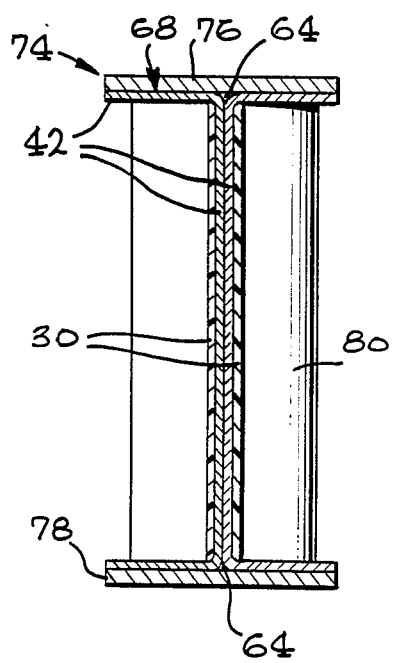
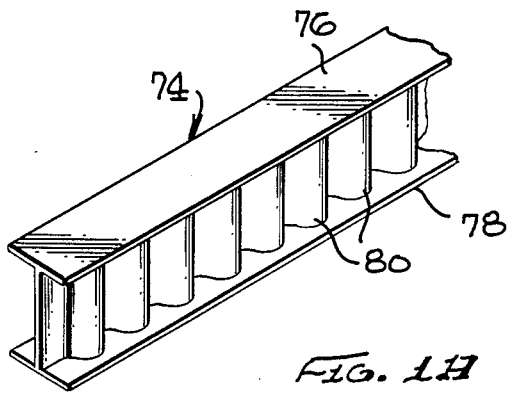

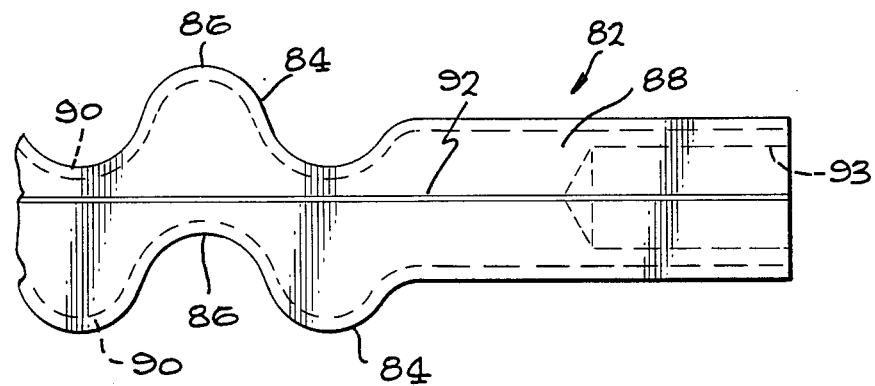
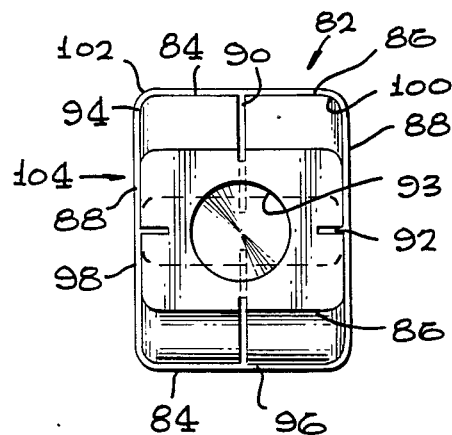
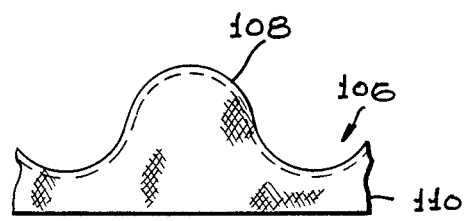
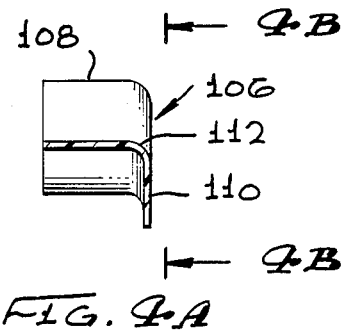
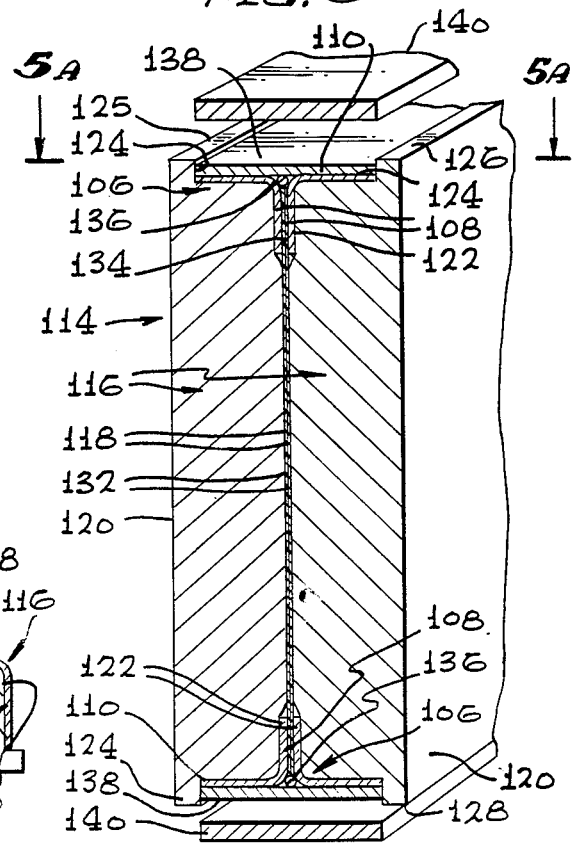
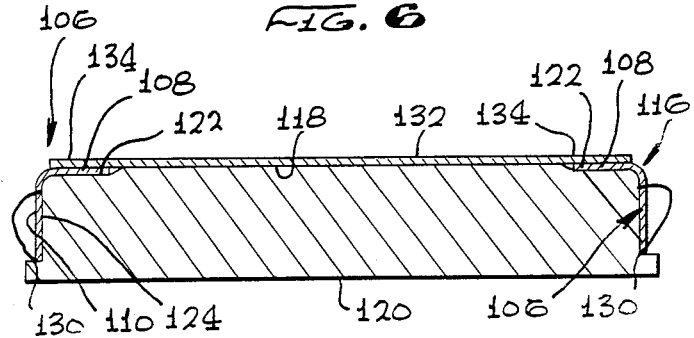

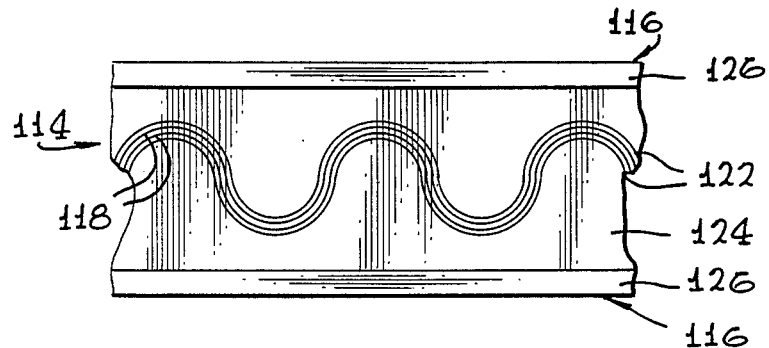
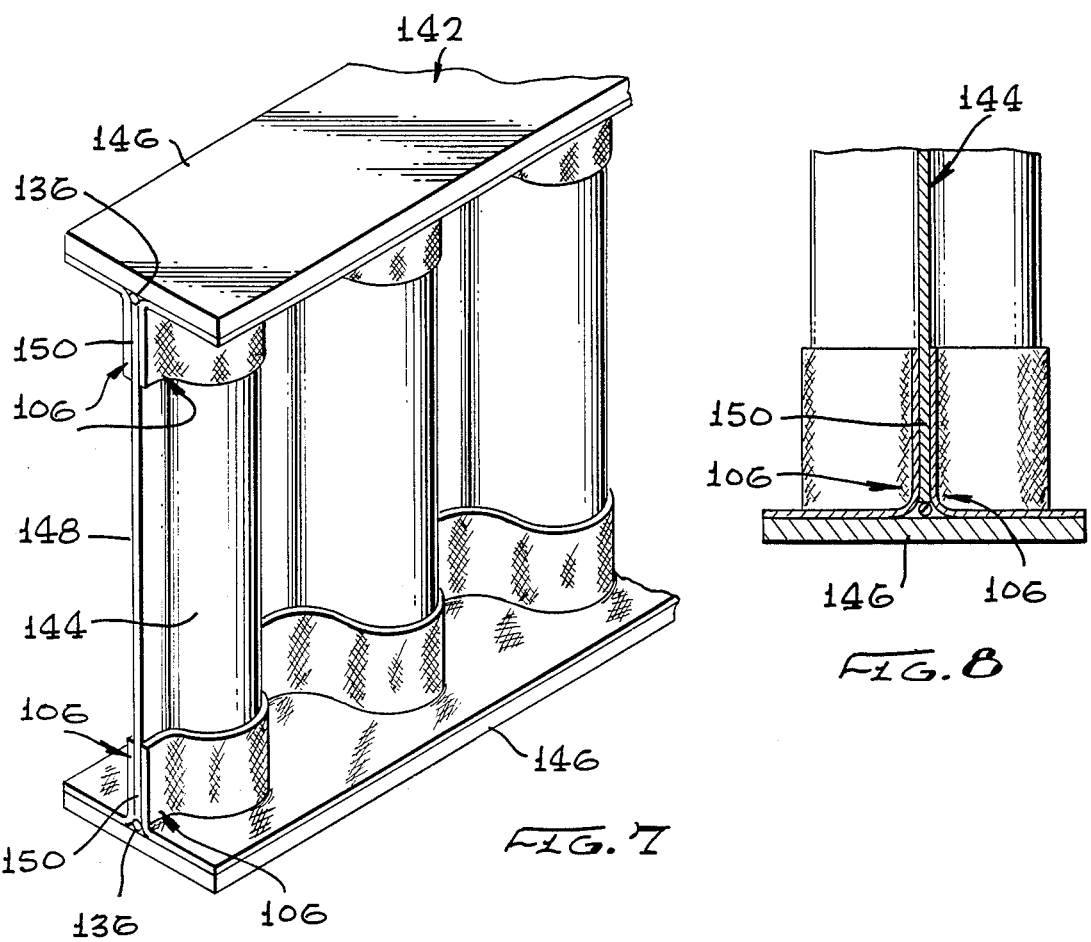
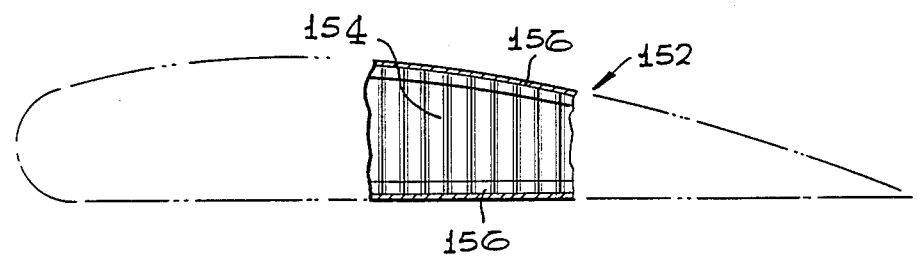

METHOD OF PRODUCING A COMPOSITE SINE WAVE BEAM

BACKGROUND OF THE INVENTION

The present invention relates to the production of composite structural beams, and is particularly concerned with a process which facilitates the fabrication of structural beams having a sine wave web integrally connected to opposite flanges, such structural elements being formed of composite materials.

Structural components particularly advantageous for aircraft and other vehicles, e.g. in the form of beams and ribs, are often made of lightweight materials relative to their strength and stiffness. Such materials are composite materials, which, as is well known in the art, are comprised of fibers of various types such as graphite fibers in cloth, and/or tape orientations, impregnated with a binder material, usually a plastic such as an epoxy resin.

A well known technique for achieving the above noted high stiffness relative to weight in structural components such as a beam, which includes a web, is to use a web having a sine wave configuration. Such a web, instead of being flat, is of a sinuous nature. However. when fabricating such beams with composite materials, using an I-beam for example, having two opposed flanges, one attached to each edge of the sinuous web, it is difficult to connect the juncture of the composite material forming the sinuous web, with the composite material of the flange areas.

In conventional practice, it is accordingly necessary to lay the tape or fabric composite material forming the sine wave web on a tool or mandrel, and manually work all the edges and corners of such composite material down to fit the juncture with the flanges. This is a difficult labor intensive procedure and which often does not produce a uniform juncture between the composite material forming the flanges and the composite material at opposite edges of the sinuous web. Such a uniform juncture is necessary in order to achieve proper load transmission between the flanges and web. Achieving such load transfer using composite materials for the flanges and sinuous web presents a serious problem. Presently, sine wave beams are being fabricated by hand or by semi-automatic procedures, with limited ability to avoid the above problem and to lower touch labor cost.

U.S. Pat. Nos. 4,084,029 and 4,198,018 are exemplary of prior art procedures for fabricating sine wave beams formed of composite materials. It is noted that in the U.S. Pat. No. 4,084,029 handwork is required to position the fabric material in order to preclude wrinkling in the web-to-flange transition. In the U.S. Pat. No. 4,198,018, a different structure is utilized, wherein the flange-to-web-to-flange ply of the composite material is continuous.

It is an object of the present invention to provide improved procedure for the fabrication of composite structural beams.

Another object of the invention is the provision of a novel process to facilitate the efficient production of composite sine wave beams, especially adapted for use as structural components in the aircraft industry, which avoids folding the sine wave web into the flat cap or flange area of the beam, and reducing labor costs.

Yet another object is to afford a cost efficient procedure for the fabrication of composite integral structural sine wave beams employing novel automated procedure for producing the juncture of the web to flange areas of the beam, and the improved structural beam so produced.

SUMMARY OF THE INVENTION

The above objects and advantages of the invention can be achieved in a process for fabricating composite structural beams, particularly a composite sine wave beam, by utilizing as an essential feature of the process, applying a braided fibrous material at the junctures of the sine wave web to the opposite flange areas of the beam while the web is in the tool used to assemble and cure the composite beam. The braided material can be in the form of fibers pre-impregnated with a resin, termed a pre-preg tow, and such braiding is heat and pressure cured, together with the composite web and flange components, when the composite beam is finally cured in the tool or mandrel.

The braiding automatically unites the juncture at the opposite edges of the composite web, with the composite cap sheets forming the opposite flanges of the beam. Such braiding can be carried out efficiently utilizing known automated braiding equipment, thus eliminating hand labor.

According to the invention there is provided a process for producing a composite structural beam, particularly a composite sine wave beam, which comprises the steps of providing a two part mandrel formed of two like half portions or segments, such half portions each having a front side of the same predetermined configuration, e.g. a sine wave configuration, and capable of being nested together along such front sides. The mandrel half portions each have a back side, preferably of planar configuration. Composite material formed of fiber reinforced heat curable resin material, e.g. partially cured thermosetting resin, and which can be in the form of tape, is placed in contact with the front configured side of each of the mandrel half portions. The mandrel half portions are then assembled together, with the back sides of the mandrel half portions in contact with each other.

The entire circumference of the mandrel assembly containing the composite material or tape on the front configured sides of the mandrel half portions is then braided with a tow material, preferably a pre-preg tow material, covering the composite material or tape on the front sides of the mandrel segments, and the top and bottom thereof. The assembly of the composite material on the front sides of the mandrel half portions and the braided material thereover, is then preferably heat set to compact such assembly. The braided material is then cut along a predetermined line on the top and bottom surfaces of the mandrel assembly to permit separation of the mandrel half portions. The mandrel half portions are then repositioned, with the front sides of both half portions containing the composite material, e.g. tape, and the braided material thereon, nested together in face-to-face contact, to form the web and a portion of the flanges of the beam.

A sheet or cap of fiber reinforced partially cured resin is placed over the braided material on the top and bottom surfaces of the resulting mandrel assembly, such cap material forming the flanges of the beam. The composite material or tape on the front sides of the mandrel half portions and the fiber reinforced sheets, as well as the resin coated braiding material, are cured under heat and pressure to form a composite structural beam, the cured composite tape material and the braided material thereon having a configuration corresponding to the configuration of the front side of the mandrel half portions, and forming the web of the composite structural beam, and the cured cap sheets and underlying braided material on the top and bottom surfaces of the mandrel half portions forming the flanges of the beam, with the web and flanges integrally connected at their juncture, by means of the braided material.

In preferred practice, the front side of each of the mandrel half portions has a sine wave configuration, and forms a composite si.ne wave beam wherein the web of the beam has a sine wave configuration.

Also, in preferred practice, prior to applying the cap sheets, a filler material in the form of a pre-preg tape can be placed in the void area adjacent opposite edges of the mandrel half sections and over the braided material along the adjacent nested configured sides at the top and bottom of the mandrel half portions.

In another preferred embodiment of the invention, the above process is modified to apply braided material at the juncture between the web and the flanges of the beam, but wherein the braided material does not extend throughout the entire height of the web, as in the embodiment described above.

In the present case, a single mandrel having a pair of opposite configured sides preferably in the form of a sine wave configuration, is braided with a tow material as described above, ro cover all sides of the mandrel. The braided material on the mandrel is then cut along a predetermined longitudinal substantially central line on each of the four sides of the mandrel, forming four like quadrants of braided material. These quadrants have an L-shaped cross section, one leg of each quadrant having a sine wave configuration, the other leg of each quadrant being substantially flat or planar. Following the cutting operation, the four quadrants are removed from the mandrel.

A cure tool is provided formed of two like half portions each having a side of sinuous or sine wave configuration and capable of being nested together along such sinuous sides. Each tool half portion has an L-shaped groove adjacent opposite edges of the sinuous side of the half portion, such L-shaped groove formed of a first groove portion which extends longitudinally and is of sinuous configuration similar to the sinuous side of the tool half portion, and a second flat groove portion in communication with the first groove portion and disposed substantially normal to the first groove portion.

An L-shaped quadrant of braided material is placed in each of the L-shaped grooves along opposite edges of each tool half portion, with the sinuous leg of the L-shaped quadrants of braided material in contact with the configured groove portion of the L-shaped grooves of the tool half portion, and with the other flat leg of the L-shaped quadrants in contact with the second groove portion of the L-shaped grooves.

A sheet of flexible composite material, e.g. in the form of tape and fabric plies, is placed in contact with the sinuous side of each tool half portion and overlying the sinuous leg of the L-shaped braided quadrants extending along opposite edges of each tool half portion, such flexible composite sheet thereby assuming the sine wave configuration of the sinuous side of the tool half portion and of the sinuous legs of the braided L-shaped quadrants.

The tool half portions are then assembled with the sinuous sides thereof containing the composite sheets or tapes and the braided quadrants adjacent opposite edges thereon, nested together in face-to-face contact and with the opposite edge portions of the composite sheets sandwiched between the adjacent sinuous legs of the L-shaped braided quadrants.

A filler material, in the form of a rolled composite tape is applied in the void area between adjacent braided quadrants along the top and bottom of the assembled tool half portions. A cap sheet of composite material such as a tape or tape plies is then placed over the horizontally extending flat legs of the L-shaped braided quadrants which are disposed in the flat grooves extending along the opposite longitudinal edges of the tool half portions, and over the composite filler material.

The composite sheet or tape on the sinuous side of the nested tool half portions and the cap sheets or tapes are cured under heat and pressure to form a composite structural beam, wherein the braided quadrants are bonded to the composite sheets having a sine wave configuration and to the cap sheets. The cured composite sine wave configured sheets and the bonded sine wave configured legs of the L-shaped quadrants adjacent opposite edges of the sheets form the web of the composite beam, and the cured cap sheets and the bonded flat legs of the braided quadrants form the flanges of the beam, whereby the web and flanges are connected at their junctures by the bonded braided quadrants. However, a major central portion of the sinuous web has no braided material bonded thereto.

A cost effective composite structural beam, particularly a sine wave beam, can be produced by the invention process by automating the individual process steps, to substantially reduce or eliminate hand labor. This can be accomplished by utilizing automated equipment such as machines for producing composite material, e.g., tape laying machines, braiding machines and composite material or tape cutters.

BRIEF DESCRIPTION OF THE DRAWING

A better understanding of the invention can be had by reference to the following detailed description, taken in conjunction with the accompanying drawing wherein:

FIGS. 1A to 1H schematically illustrate the various steps in preferred practice of the invention process;

FIG. 2 is a transverse section of the composite sine wave beam produced by the process illustrated in FIGS. 1A to 1H.

FIG. 3 is a plan view of a mandrel employed in a modified procedure for producing a sine wave beam according to the invention;

FIG. 4 is an end view of the mandrel of FIG. 3, showing the braided material wrapped around the mandrel;

FIG. 4A is an end view of one of the four quadrants of braided material removed from the mandrel of FIGS. 3 and 4:

FIG. 4B is a plan view of the braided quadrant of FIG. 4A, on line 4B—4B of FIG. 4A;

FIG. 5 is a perspective view of a tool for curing the components of the sine wave beam, including the braided quadrants of FIGS. 4A and 4B, and the composite sheets and cap strips required to produce a braided sine wave beam;

FIG. 5A is a plan view of the tool of FIG. 5, taken on line 5A—5A of FIG. 5, omitting the braided quadrants, composite sheets and cap strips shown in FIG. 5;

FIG. 6 is an end view of a half portion of the tool of FIG. 5, containing thereon a pair of braided quadrants and a composite sheet material for forming the sine wave web of the sine wave beam;

FIG. 7 is a perspective view of a sine wave beam produced after curing the assembly of components in the cure tool of FIG. 5;

FIG. 8 is a partial sectional elevation of the sine wave beam of FIG. 7; and

FIG. 9 is a modified tapered sine wave beam, shown partly broken away, which can be produced by the invention process.

DETAILED DESCRIPTION OF THE INVENTION AND PREFERRED EMBODIMENTS

Figure 1A:
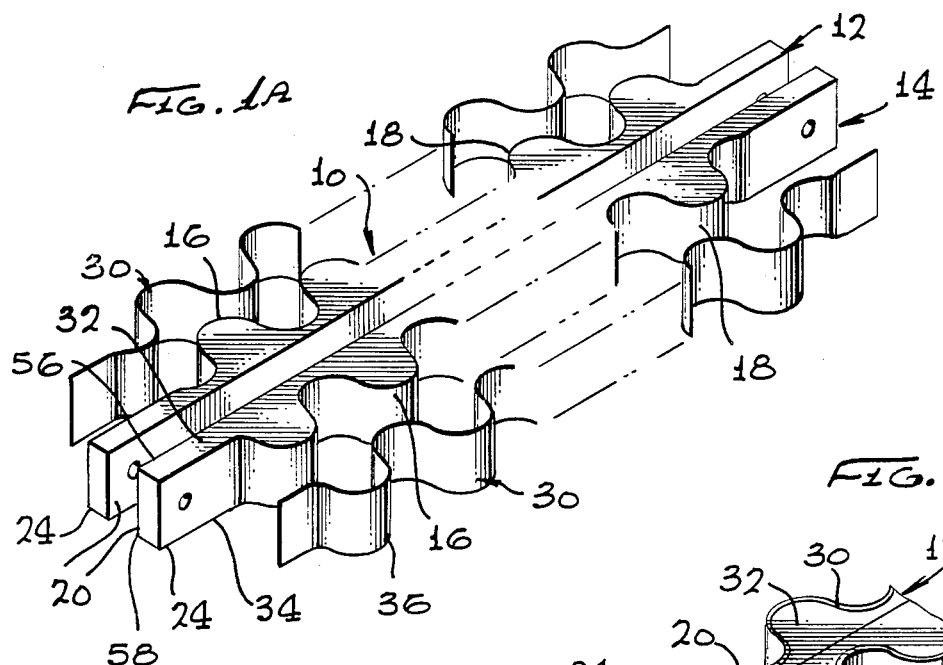

Referring to FIG. 1A of the drawing, numeral 10 is a two part tool or mandrel formed of two like longitudinally extending mandrel half portions or segments 12 and 14. The tool can be formed of metal or any other suitable tooling material such as high temperature fiberglass or graphite. Each of the mandrel half portions has a front side 16 in the form of a sine wave configuration indicated at 18, the sine wave configurations on the front sides of both half portions being the same or matching, and capable of being nested together, as described and shown hereinafter. Each of the mandrel half portions 12 and 14 has a flat or planar back side 20.

A flexible composite material indicated at 30 is placed in contact with the front sine wave configured side 16 of each of the mandrel half portions 12 and 14, so that such composite material has the same sine wave configuration as the front sides 16 of such mandrel half portions. It is noted that the composite material 30 only extends to the width of the mandrel or mandrel half portions 12 and 14, and does not extend over the planar top and bottom surfaces 32 and 34 of the mandrel or mandrel half portions.

The flexible composite material 30 is in the form of a fiber reinforced composite material such as graphite, impregnated with a tough resinous polymer, which can be thermosetting such as epoxy or epoxy-novelac resin. The resin is partially cured, e.g., "B" staged, or between "B" and "C" staged, to permit final curing by the application of heat. Other reinforcing fibers such as boron, fiberglass or fibers of an organic material such as a polyamide, e.g. Kevlar, understood as comprised of poly (paraphenylterephthalamide), can be employed in place of graphite. Other heat curable resins which can be employed include partially cured polyamide or polyimide resin, as well as high temperature thermoplastic material such as the resin marketed as "Peek" resin, understood to be a polyether ether ketone resin, polyphenylene sulfone and polycarbonate resins.

The flexible composite material 30 is fabricated by continuous lay-up and lamination of plies of partially cured fiber reinforced resinous strips forming a unitary tape, the fibers of which are oriented at 90°, as indicated at 36, and hence in this particular embodiment is termed "90° graphite/epoxy tape." The flexible composite material or tape 30 has sufficient tackiness to remain in contact with the front sinuous side 16 of each of the mandrel half portions after being applied thereto.

Figure 1B:
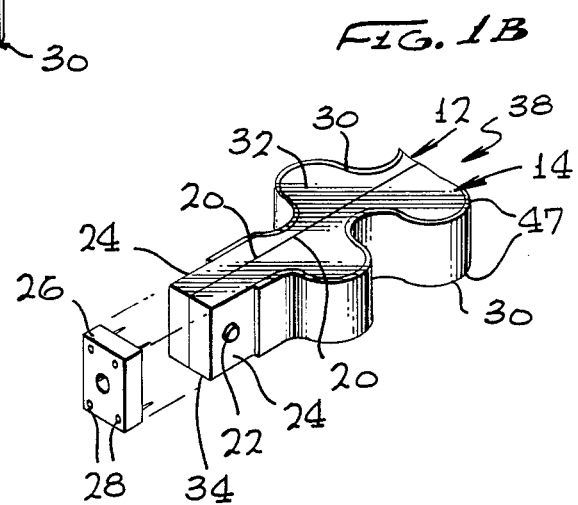
Figure 1D:
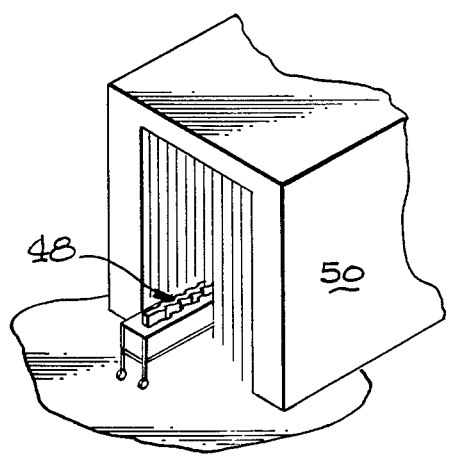

As shown in step FIG. 1B in the drawing, the separated mandrel half portions 12 and 14, with the composite tapes 30 adhered thereto, are assembled in back-to-back relation and fastened together by suitable fasteners at 22 at opposite end portions 24 of the mandrel half portions, and are further secured together by means of end plates 26 connected by means of suitable fasteners 28 to the opposite ends of the mandrel half portions.

If desired, the composite material or tapes 30 can be placed in contact with the front sine wave configured sides of the mandrel half portions after they have been assembled as shown in step FIG. 1B.

Figure 1C:
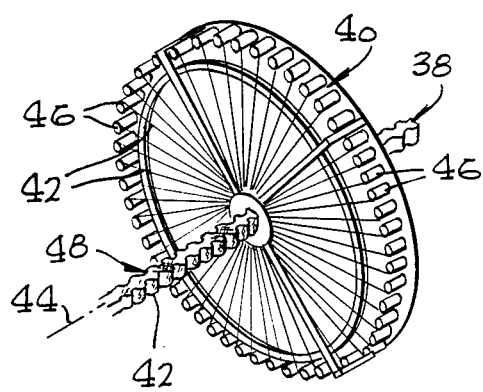

Referring now to FIG. 1C of the drawing, the assembly 38 of FIG. B, formed of the secured mandrel half portions 12, 14 with the composite material or tape 30 secured to the front sides thereof, is passed through a braiding machine 40 to braid and envelope such assembly with braided fibrous material, indicated at 42. The braiding material can be in the form of a "pre-preg" tow of fibers, or filaments, e.g. 6,000 filaments, which can be graphite filaments, coated with a partially cured resin, such as epoxy resin. Alternatively, such fibers or filaments can be boron, fiberglass or polyamide, e.g. Kevlar, and other partially cured resins such as those described above can be coated on such fibers in place of epoxy resin. The braiding material is preferably dry, i.e., non-tacky. Although the use of fibers coated or impregnated with a suitable resin is preferred, untreated fiber braiding material can be used.

In the form of the braiding machine 40 shown in FIG. 1C, the assembly 38 of the mandrel 10 and sinuous fibrous material or tape 30 thereon, is passed horizontally through the center or axis 44 of the machine, and picks up 144 sets of fiber tows fed from 144 spindles 46 positioned circumferentially around the braiding machine. As the mandrel assembly 38 passes through the center of machine 40, the entire circumference of the assembly is covered or enveloped with the braiding material or pre-preg tows at 42, including the top and bottom 32, 34 of the mandrel half portions 12, 14, and covering the composite material or tapes 30 on both mandrel half portions. It will be noted that the upper and lower sinuous edges on the front sides 16 of each of the mandrel half portions has a slightly rounded or radiused edge, as indicated at 47, to prevent cutting of the braiding material in this operation.

After the composite material 30 has been braided on the mandrel as shown in FIG. 1C, the braided assembly 48 is then subjected to heating in a furnace at 50, e.g. at about 140° to 150° F., under a vacuum. Such heat setting treatment compacts the braiding 42 down around the assembly, without any curing of the resin occurring either in the composite material or tape 30, or in the coating on the braided material 42. However, if the braiding material is sufficiently tight and compact around the assembly, the heat setting step can be omitted.

Figure 1E:
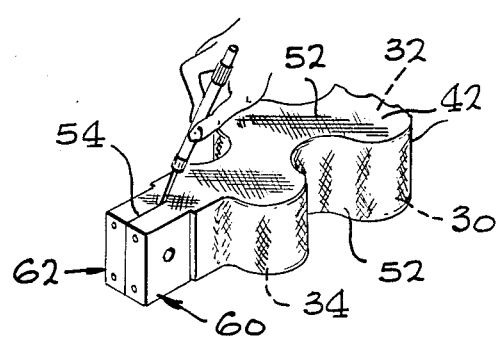

Now referring to FIG. 1E of the drawing, following the compaction step, the laminate 52 formed by the braided material 42 on the top and bottom surfaces 32 and 34 of the mandrel is cut along a prescribed longitudinal central line 54 indented along the back upper and lower edges 56 and 58 (see FIG. 1A) of the back sides 20 of each of the mandrel half portions 12 and 14, as a cutting guide. This permits separation of the two mandrel half portion assemblies 60 and 62, with the compacted composite material 30 and overlying braided material 42 retained on the front sides 16 of the mandrel segments, while the braided material 42 alone remains in place on the top and bottom surfaces of the mandrel half portions.

In the step illustrated in FIG. 1F of the drawing, after removal of the end plates 26 the mandrel half portion assemblies 60 and 62 are unfastened and are separated and repositioned with their front sinuous sides 16 containing the composite tape material 30 and the braiding 42 thereon, nested together in face-to-face contact with each other. Thus, each of such mandrel half portion assemblies or segments is now positioned so that the two sinuous composite tapes 30 covered with braided material 42 on both of the contacting mandrel assemblies, together will form the web of the final sine wave beam, and the braiding 42 on the top and bottom surfaces of the mandrel half portions will form a portion of the flanges.

Referring now to FIG. 1G of the drawing, a filler material indicated at 64 is then inserted into the void or recessed area 66 (see FIG. 1F) formed between the adjacent rounded upper edges 47 of the nested sinuous braided sides along the top of the mandrel half portions, and between the adjacent rounded lower edges 47 of such sinuous braided sides along the bottom of the mandrel half portions. Such filler material is also a composite material of the types described above. Thus, such filler material can be a tape formed of a fiber reinforced partially cured resin such as a unidirectional partially cured graphite-epoxy "pre-preg" tape. The tape can be rolled up in the form of a long thin cylinder and inserted into the sinuous void area 66 in the top and bottom surfaces of the mandrel assembly.

Cap material 68 in the form of a composite sheet of fiber reinforced heat curable resin material of substantially the same composition as the composite material or tape 30, described above, is then placed over the braided material 42 and the filler tape 64, on the upper and lower surfaces of the mandrel assembly. The composite sheets 68 are fabricated by continuous lay-up and lamination of strips 70 of partially cured fiber reinforced resinous tapes of the above noted composition, e.g. graphite-epoxy tapes, which are directionally oriented in each ply and a plurality of plies laminated in a predetermined relationship. Thus, each of such layers or plies can be in the form of a partially cured tape or "pre-preg", and the layers or plies of such tape can be oriented in various directions such as 020, 45° and 90°, as shown, to thus provide a material having high strength when finally cured. In such tapes the fibers also can be oriented at various angles to enhance strength. Cap plates 72 are then applied over the composite cap material or tapes 68 on the top and bottom surfaces of the mandrel assembly, to facilitate forming a predetermined surface, for example, flat upper and lower flanges on the beam during the curing step.

Such assembly can then be compacted by "vacuum debulking", that is by placing a bag over the entire assembly and applying a vacuum. After compaction of the assembly, to compact the cap sheets 68, the underlying braided material 42 and the filler tape 64 together, the bag is removed. While such compaction is preferred, in some cases it may be omitted.

The assembly in FIG. 1G of the assembled mandrel half portions containing the flexible sinuous composite sheets 30 attached to the front sides of each of the mandrel half portions, the braided material 42 on the upper and lower surfaces of the mandrel assembly and the braided material 42 sandwiched between the sinuous composite sheets 30, the filler tapes 64 and the cap sheets 68, is then vacuum bagged in the usual manner and subjected to a conventional cure cycle in an autoclave, e.g. at 85 psi and 350° F. Thus, the final curing operation co-cures the cap sheets 68 to the adjacent braided material 42 on the upper surfaces of the mandrel, and to the outer edges of the web formed by the sinuous composite sheets 30, via the co-cured filler tapes 64. The adjacent composite sheets 30 on the nested mandrel half portions are also each co-cured to the adjacent braided material 42 overlying and between such adjacent composite sheets.

Following final curing, the cap plates 72 and the mandrel half portions 12 and 14 are removed, resulting in the completed composite braided sine wave structural beam 74, shown in FIG. 1H, having the opposite parallel planar flanges 76 and 78 integrally connected to the opposite edges of the sinuous web 80, and having the cross-sectional structure shown in FIG. 2. The beam 74 is a composite unitary sine wave beam, the web and flanges of which are connected together at their juncture with the aid of the braided material 42, and wherein the sine wave juncture of the web-to-flange areas can be automated by means of braiding. The cap areas are preplied to the desired ply orientation by means of conventional tape laying machines and/or Gerber cutters.

It is noted that the primary function of the braiding is to strengthen the transition or juncture between the web, and the flanges or caps of the composite beam. This braiding concept permits greater flexibility in making larger composite structural components such as ribs and spars of substantial height, and also which can vary in cross-section, without tedious hand lay-up, wrinkling, and other labor intensive operations.

In FIGS. 3 to 6 of the drawings there is illustrated the steps and means employed in a preferred modifified procedure for producing a modified composite sine wave beam, wherein braided material is applied at the juncture between the web and the flanges, but the braided material does not extend throughout the entire height of the web, as in the embodiment of FIGS. 1 and 2.

In FIGS. 3 and 4 there is shown a one piece tool or mandrel 82 formed of a suitable material such as hardwood or high temperature graphite. The mandrel 82 has a pair of opposite sides 84 in the form of a sine wave configuration having synchronous or matching undulations indicated at 86, and a pair of opposite flat or planar sides 88. A pair of oppositely disposed central longitudinally extending notches 90 are provided in the opposite sinuous sides 84 of the mandrel, and a pair of oppositely disposed central longitudinally extending notches 92 are provided in the opposite planar sides 88 of the mandrel. The mandrel 82 has a substantially square cross section, as seen in FIG. 4.

The mandrel 82 is passed longitudinally through a braiding machine in the manner described above and illustrated in FIG. 1C, utilizing an actuating member indicated at 93 for this purpose, so that the entire circumference of mandrel 82 is covered with the braiding material, e.g. in the form of pre-preg tows of fibers, which can be graphite fiber coted with a partially cured resin, e.g. epoxy resin, as described above. In this embodiment, the pre-preg tows have a degree of tackiness, for reasons noted below. In the present embodiment, after the first layer of braided material is applied over mandrel 82, the mandrel assembly is again passed through the braiding machine to apply a second layer of braided material over the first layer thereof, to increase the strength of the braided material. The direction of the fiber tows in the two layers can be different. It will be understood that the application of two layers of braided material to the mandrel 82 is optional and only a single layer of braided material can be employed.

The braided material 94 covering the mandrel 82 accordingly has a shape corresponding to the shape of mandrel 82, and thus has a pair of opposite sinuous sides 96 and a pair of opposite planar sides 98. It will be noted that the mandrel 82 has rounded outer edges 100 to prevent cutting of the braiding material during the braiding operation, and the braided material 94 on the mandrel also has similarly rounded outer edges at 102.

The laminate 104 formed by the braided material 94 on the mandrel, is cut along the prescribed longitudinal central lines defined by the notches 90 in the opposite sinuous sides 84 of the mandrel, and along the prescribed longitudinal central lines defined by the notches 92 in the opposite planar sides 88 of the mandrel. This cuts the laminate or shell 104 of the braided material covering the mandrel into four quadrants 106 having an L-shaped cross section, illustrated in FIGS. 4A and 4B, one leg 108 of each quadrant extending longitudinally in a sinuous configuration, the other leg 110 extending longitudinally in flat or planar form, the legs 108 and 110 being substantially normal to each other. The edge forming the juncture between the two legs is rounded at 112. The quadrants 106 of braided material are then removed from the mandrel. As previously noted, the tows of braided material coated with partially cured resin are sufficiently tacky so that the L-shaped quadrant shells 106 of braided material, although flexible, retain sufficient stiffness after being removed from the mandrel to maintain their shape.

As shown in FIG. 5, a solid graphite cure tool 114 is provided, which is formed of two like half portions or segments 116, (see also FIG. 6), each having a side 118 in the form of a sine wave configuration, as seen in FIG. 5A, the sine wave configurations of sides 118 of both half portions 116 being matching when nested together, as seen in FIG. 5A. Each of the half portions 116 of the tool has a flat or planar back side 120.

Adjacent opposite edges of the sinuous side 118 of each half portion 116 of the tool is provided a sinuous vertical groove 122 which extends longitudinally along the sinuous side 118, and a horizontal planar groove 124 is provided in the top 126 and bottom 128 of each of the tool half portions 116, the upper and lower horizontal grooves 124 in each tool half portion each communicating with the adjacent sinuous vertical groove 122, thus forming two L-shaped grooves 130, the groove portions 122 and 124 of which are substantially normal to each other. The L-shaped grooves 130 extend along opposite longitudinal edges of each tool half portion 116, as seen in FIGS. 5 and 6, to receive the L-shaped sinuous quadrants of braided material 106, as further described below.

For producing a composite beam according to this embodiment, the cure tool 114 is separated into its two half portions 116, as seen in FIG. 6, and an L-shaped quadrant of braided material 106 is placed in each of the two opposite L-shaped grooves 130 of each half portion, with the sinuous leg 108 of each quadrant in contact with the sinuous groove 122 and the other planar leg 110 of each quadrant in contact with the planar groove 124. Thus, each of the quadrant shells 106 of the braided material matches and fits into such L-shaped grooves, and extends longitudinally, with the sinuous leg 108 of each quadrant in contact with the sinuous wall of the groove 122.

A flexible composite sheet 132 is fabricated by lay-up of two or more plies of partially cured fiber reinforced resinous strips, the plies of which can be oriented in various directions such as +45° and −45°. The composite flexible sheet 132 has substantially the same composition as that of the composite material or tape 30 in the embodiment of FIG. 1A, as described above. The lay-up 132 is placed longitudinally along and in contact with the sinuous side 118 of the tool half portion 116, and hence assumes the sine wave configuration of side 118. It is seen that the opposite edge portions 134 of the lay-up 132 overlie the sinuous extending leg 108 of the L-shaped quadrants of braided material in the L-shaped grooves 130 along each edge of the tool, and also assumes the sine wave configuration of the sinuous legs 108. However, the lay-up 132 does not extend beyond the outer edges of the sinuous grooves 122 on opposite sides of the tool half portion 116.

The two half portions 116 of the tool, each having assembled thereon the two L-shaped quadrants of braided material 106 along opposite edges and the lay-up or sheet 132 in contact with the sinuous side 118 of the tool half portion and in contact with the sinuous leg 108 of the two braided quadrants, are nested together in face-to-face contact with each other, as seen in FIG. 5. Thus, each of the tool half portions 116 is now positioned so that the two sinuous lay-ups 132 of the nested tool half portions are in contact and form the web of the final sine wave beam, with the opposite edge portions 134 of the two contacting lay-ups disposed adjacent the vertical grooves 122 being sandwiched between the adjacent sinuous legs 108 of the two adjacent L-shaped braided quadrants 106, both at the top and bottom of the tool assembly in FIG. 5.

A filler material indicated at 136 is then inserted into the void formed between the adjacent rounded edges 112 of the two adjacent braided quadrants 106 along the top of the tool half portions, and into the void between the adjacent rounded edges 112 of the two adjacent braided quadrants 106 along the bottom of the tool half portions. Such filler material is a composite material, e.g. a rolled-up tape of the same composition as the filler material 64 in FIG. 1G, and described above, such as a partially cured graphite-epoxy pre-preg tape tape.

Cap strips 138 in the form of a composite sheet of fiber reinforced heat curable resin material of substantially the same composition as the cap sheets 68 in FIG. 1G and described above, are provided. Such cap strips can be, for example, several plies of unidirectional graphite-epoxy tape laid up on a flat surface and cut to fit within the horizontal grooves 124 formed by the two assembled tool half portions, as shown in FIG. 5. The cap strips 138 are placed within the grooves 124 between the opposite edge flanges 125 along the top and bottom of the tool assembly, such cap strips overlying the flat legs 110 of the adjacent braided quadrants 106 in grooves 124 and the filler material 136 along the top and bottom of the tool assembly. The cap strips 138 form the opposite flanges of the final sine wave beam.

Cap plates 140 are then applied over the cap strips 138 at the top and bottom of the tool assembly. If desired, a bag can be placed over the entire assembly, and such assembly then compacted by "vacuum debulking" as described above.

The resulting assembly is then vacuum bagged and subjected to conventional curing as described above. The final curing operation co-cures the cap strips 138 to the adjacent braided material of legs 110 of the adjacent L-shaped braided quadrants 106, and to the outer edges of the web formed by the sinuous sheets or lay-ups 132, via the co-cured filler tape 136. The opposite edge portions 134 of the adjacent composite sheets 132 forming the beam web, on the nested tool assembly are also co-cured to the braided material of the sinuous legs 108 of the adjacent L-shaped braided quadrants 106.

Following final curing, the cap plates 140 and the tool half portions 116 are disassembled, resulting in the completed composite sine wave beam 142 shown in FIGS. 7 and 8. In beam 142, the sinuous web 144 is connected or braided at its opposite edges to the flanges 146, and the braided material provided by the four braided quadrants 106, which are co-cured and bonded to the flanges and to the opposite edge portions of the web, affords a strong transition or juncture between the web and the flanges. It will be noted that in the present embodiment a major central portion 148 of the web 144, intermediate the opposite edge portions 150 of the web has no braided material connected thereto, and only the outer edge portions 150 adjacent the junctions of the web and the flanges having braided material 106 connected thereto.

The process of the embodiment described above and illustrated in FIGS. 3 to 8 of the drawings also can be applied for the construction of composite structural beams which vary in cross section along the length of the beam. Thus, for example, as seen in FIG. 9 a tapered structural composite sine wave beam 152 having a structure similar to that shown in FIG. 7 can be constructed, but wherein the sinuous web 154 is tapered along the length of the beam, and the flanges 156 follow the tapered configuration of the web. For this purpose the mandrel 82 and the cure tool 114 can be varied in shape to produce such tapered beam. Tapered composite beams of this type employing a braided material transition between the flanges and the web according to the invention concept, are particularly useful for aircraft applications.

Although the improved method of the invention is particularly adapted to production of sine wave beams, it can also be applied to other shapes, including conventional "I" section beams having a flat planar web, and the like.

Thus, the invention process can be practiced readily employing basic machine components comprising a suitable mandrel on which to apply the composite tape material and/or the pre-preg tows of braiding material, automated equipment including Gerber cutter, tape layer and braiding machine, and cap plates to ensure the shape of the part, together with state-of-the art curing procedures, i.e. debulking, bagging and autoclaving.

From the foregoing, it is seen that the invention provides an improved method for fabricating composite structural beams, particularly sine wave beams, wherein the web-to-flange area is connected by braiding, particularly employing automated means to facilitate the fabrication of the structural beam, and thus avoiding the necessity for folding the sine wave web into the flat flange area according to the prior art, and which is labor intensive. Composite light weight strong structural beams such as composite sine wave beams, are advantageously employed as aircraft structural components, such as wing spars, wing ribs, fuselage frames, longerons and floor beams.

Since various changes and modifications of the invention will occur to and can be made readily by those skilled in the art without departing from the invention concept, the invention is not to be taken as limited except by the scope of the appended claims.

What is claimed is:

1. A process for producing a composite structural beam which comprises the steps of
   providing a two part mandrel formed of two like half portions, said half portions each having a front side of the same predetermined configuration, and capable of being nested together along said front sides, said half portions each having a back side,
   placing a flexible composite material formed of fiber reinforced heat curable resin material in contact with the front configured side of each of said mandrel half portions,
   assembling said mandrel half portions together with the back sides of said mandrel half portions in contact with each other,
   braiding the entire circumference of the mandrel assembly containing said composite material on the front sides of said mandrel half portions, with a tow material,
   cutting the braided material along a predetermined line on the top and bottom surfaces of the mandrel assembly to permit separation of the mandrel half portions,
   separating and repositioning the mandrel half portions with the front sides of both half portions containing said composite material and the braided material thereon, nested together in face-to-face contact,
   placing a cap sheet of fiber reinforced partially cured resin over the braided material on the top and bottom surfaces of the resulting mandrel assembly, and
   curing the composite material on the front sides of the mandrel half portions and the fiber reinforced sheets under heat and pressure to form a composite structural beam, said cured composite material and braided material thereon having a configuration corresponding to the configuration of the front side of said mandrel half portions, and forming the web of said composite structural beam, and said cured cap sheets and underlying braided material forming the flanges of said beam, said web and flanges connected at their juncture by said braided material.

2. The process of claim 1, wherein the braided material extends along the entire web between said junctures.

3. The process of claim 1, the front side of each of said mandrel half portions having a sine wave configuration, and forming a composite sine wave beam wherein the web of said beam comprised of said cured composite material and braided material, has a sine wave configuration.

4. The process of claim 3, the back sides of said mandrel half portions having a flat planar configuration.

5. The process of claim 1, including connecting end plates to opposite ends of said mandrel half portions to secure the mandrel half portions together prior to the braiding step, and removing said end plates after said cutting step to permit said separation and repositioning of said mandrel half portions.

6. The process of claim 1, including heat setting the assembly of the composite material on the front sides of the mandrel half portions and the braided material thereover, to compact such assembly, prior to said cutting step.

7. The process of claim 1, said cutting of said braided material being carried out along a central prescribed line as cutting guide indented in the top and bottom surfaces of the mandrel half portions along the back side of each of the mandrel half portions.

8. The process of claim 1, the upper and lower edges of the front configured sides of each of the mandrel half portions being slightly rounded to prevent cutting of the braiding material, and following the step of repositioning the mandrel half portions, inserting a filler material composed of pre-preg tape in the void areas formed between the adjacent rounded edges of the nested braided front sides of the mandrel half portions, along the top and bottom of said mandrel half portions.

9. The process of claim 1, and prior to said curing step, placing cap plates in contact with said sheets to facilitate forming flat upper and lower flanges on said beam during said curing step.

10. The process of claim 1, wherein said composite material and said sheets are formed of heat curable thermosetting or thermoplastic resin reinforced with graphite, boron, fiberglass or organic fibers.

11. The process of claim 1, wherein said composite material and said sheets are formed of layers of tape comprised of graphite, boron, fiberglass or polyamide fibers, impregnated with partially cured epoxy or epoxy novelac resin.

12. The process of claim 11, said braiding material comprised of graphite, boron, fiberglass or polyamide fiber tows impregnated with partially cured epoxy or epoxy novelac resin.

13. The process of claim 1, wherein the braided material extends along the entire web and along the entire flange areas of said beam.

14. A process for producing a composite structural sine wave beam which comprises the steps of
providing a two part longitudinally extending mandrel formed of two like sections, said sections each having a front side of matching sine wave configuration, said sections capable of being nested together along said front sides, said sections each having a planar back side and top and bottom planar surfaces,
placing graphite-epoxy tape plies in contact with the front sine wave configured side of each of said mandrel sections, so that said tape plies have a sine wave configuration,
assembling said mandrel sections together in secured relation, with the planar back sides thereof in contact,
passing said assembled mandrel sections through a braiding apparatus, and surrounding the entire circumference of said assembled mandrel sections including the top and bottom planar surfaces of said mandrel sections and the sine wave configured sides thereof containing said tape plies, with a braiding material in the form of a pre-preg tow of resin coated graphite fibers, said mandrel sections each having slightly rounded edges at the intersection of the sine wave configured sides thereof with the top and bottom surfaces thereof, to prevent cutting of said braiding material,
heat setting the assembly of tape plies on the front sides of said mandrel sections and the braided material thereover, to compact such assembly,
cutting the braided material along a prescribed center line on the top and bottom surfaces of the mandrel sections along the upper and lower edges of the back sides of said sections,
separating and repositioning the mandrel sections, with the front sine wave configured sides containing said sine wave configured tape plies and the braided material thereon, nested together in face-to-face contact, to form the sine wave web of said beam,
inserting a graphite-epoxy tape filler in the void formed along the adjacent sinuous rounded edges of said mandrel sections on the top and bottom surfaces thereof,
placing a cap sheet formed of plies of graphite-epoxy resin over the braided material and over the sinuous tape filler on the top and bottom surfaces of said repositioned mandrel sections, to form the flanges of said beam, and
curing the resulting assembly under heat and pressure to form a composite structural sine wave beam.

15. The process of claim 14, including connecting end plates to opposite ends of said mandrel sections to secure the mandrel sections together prior to the braiding step, and removing said end plates after said cutting step to permit said separation of said mandrel sections.

16. The process of claim 15, and prior to said curing step, placing cap plates in contact with said cap sheets to facilitate forming flat upper and lower flange surfaces on said beam during said curing step.

17. The process of claim 14, the fibers of said pre-preg tow of graphite fiber braiding material being coated with an epoxy resin.

18. The process of claim 14, said heat setting being carried out while subjecting the assembly to a vacuum, and at a temperature insufficient to cause curing of said tape plies or said braiding material.

19. The process of claim 18, including the step of debulking the assembly prior to said curing, and said curing being carried out by vacuum bagging the debulked assembly and curing the assembly in an autoclave.

20. A process for producing a composite structural beam which comprises the steps of
providing a longitudinally extending mandrel having four sides including a pair of opposite sides of like predetermined matching configuration and a pair of opposite flat sides,
braiding the entire circumference of said mandrel with a tow material,
cutting the braided material on the mandrel along a predetermined longitudinal line on each side of the mandrel, and forming four like quadrants of braided material, each having an L-shaped cross-section, one leg of said L-shaped quadrants extending longitudinally and having said predetermined configuration, the other leg of such L-shaped quadrants extending longitudinally in flat form,
removing said quadrants from said mandrel,
providing a tool formed of two like half portions, said half portions each having a side of the same predetermined configuration, and capable of being nested together along said predetermined configured sides, and including a first groove adjacent opposite edges of the configured side of each tool half portion and extending longitudinally in a predetermined configuration corresponding to the predetermined configuration of said one leg of said L-shaped quadrants, and a second flat groove communicating with said first groove and disposed at an angle thereto, said first and second grooves together forming a pair of L-shaped grooves extending along opposite longitudinal edges of said tool half portions, placing an L-shaped quadrant of braided material in each of said L-shaped grooves along opposite edges of each of said tool half portions, with said one configured leg of the L-shaped quadrants of braided material in contact with the first configured groove of said L-shaped groove of said tool half portions, and said other leg of the L-shaped quadrants in contact with the second groove of said L-shaped groove, placing a sheet of flexible composite material formed of fiber reinforced heat curable resin material in contact with the configured side of each tool half portion and overlying the configured leg of the L-shaped braided quadrants extending along opposite edges of each tool half portion, said flexible composite sheet thereby assuming the configuration of the configured side of said tool half portion and of the configured legs of said L-shaped quadrants, assembling the tool half portions, with the configured sides thereof containing said composite sheets and the braided quadrants thereon, nested together in face-to-face contact, and with the opposite edge portions of said composite sheets sandwiched between the adjacent configured legs of the L-shaped braided quadrants, placing a cap sheet of fiber reinforced partially cured resin over the other flat legs of said L-shaped braided quadrants disposed in the flat grooves extending along the opposite longitudinal edges of said tool half portions, and curing the composite sheets on the configured side of the tool half portions and the cap sheets under heat and pressure to form a composite structural beam, said braided quadrants being bonded to said composite sheets and to said cap sheets, said cured composite sheets and the bonded configured legs of said L-shaped quadrants adjacent opposite edges of said sheets forming the web of said composite beam, and said cured cap sheets and the bonded flat legs of said braided quadrants forming the flanges of said beam, said web and flanges connected at their junctures by said braided quadrants.

21. the process of claim 20, wherein the braided material extends along only a portion of the web beyond said junctures.

22. The process of claim 20, the configured sides of said mandrel and said one leg of said braided L-shaped quadrants having a matching sine wave configuration, and the configured side of said tool half portions and the first configured groove adjacent opposite edges of said last mentioned configured side also having a sine wave configuration matching that of said one leg of said L-shaped quadrants, and forming a composite sine wave beam wherein the web of said beam comprised of said cured sheets of flexible composite material and the sine wave configured legs of said L-shaped quadrants bonded along opposite edges of said sheets, has a sine wave configuration, the legs of said braided L-shaped quadrants being disposed substantially normal to each other, and the first and second grooves of the L-shaped grooves along opposite edges of said tool half portions, also being disposed substantially normal to each other.

23. The process of claim 20, said cutting of the braided material on the mandrel to form said braided quadrants being carried out along a central prescribed line as cutting guide, defined by a central longitudinal notch provided in each of the four sides of the mandrel.

24. The process of claim 20, the corners of all of the longitudinally extending edges of said mandrel half portions being slightly rounded to prevent cutting of the braiding material, and forming slightly rounded corners on said braided L-shaped quadrants, and the longitudinal edges of said tool half portions adjacent said L-shaped grooves also being slightly rounded to accommodate said slightly rounded corners of said L-shaped quadrants.

25. The process of claim 24, including inserting a filler material comprised of pre-preg tape in the void areas formed between the adjacent slightly rounded edges of nested adjacent braided L-shaped quadrants along the top and bottom of said tool, and co-curing said filler material to the opposite edges of said sheets of flexible composite material and to said cap sheets.

26. The process of claim 20, wherein said sheets of flexible composite material and said cap sheets are formed of heat curable thermosetting or thermoplastic resin reinforced with graphite, boron, fiberglass or organic fibers.

27. The process of claim 20, wherein said sheets of flexible composite material and said cap sheets are formed of layers of tape comprised of graphite, boron, fiberglass or polyamide fibers, impregnated with partially cured epoxy or epoxy novelac resin.

28. The process of claim 27, said braiding material comprised of graphite, boron, fiberglass or polyrumide fiber tows impregnated with partially cured epoxy or epoxy novelac resin.

29. The process of claim 20, including the step of debulking the assembly prior to said curing, and said curing being carried out by vacuum bagging the debulked assembly and curing the assembly in an autoclave.

30. The process of claim 20, wherein the braided material extends along only the outer edge portion of said web adjacent the junctures thereof with the flanges, and the braided material extending along the entire flange areas of the beam.

* * * * *